United States Patent
Ramaprabhu et al.

(10) Patent No.: US 8,623,784 B2
(45) Date of Patent: Jan. 7, 2014

(54) POLYANILINE-GRAPHITE NANOPLATELET MATERIALS

(75) Inventors: Sundara Ramaprabhu, Chennai (IN); Ashish Kumar Mishra, Ghazipur (IN)

(73) Assignee: Indian Institute of Technology Madras, Chennai, IN (US)

( * ) Notice: Subject to any disclaimer, the term of this patent is extended or adjusted under 35 U.S.C. 154(b) by 0 days.

(21) Appl. No.: 13/581,616

(22) PCT Filed: Dec. 19, 2011

(86) PCT No.: PCT/IB2011/003083
§ 371 (c)(1),
(2), (4) Date: Aug. 29, 2012

(87) PCT Pub. No.: WO2013/057534
PCT Pub. Date: Apr. 25, 2013

(65) Prior Publication Data
US 2013/0102460 A1    Apr. 25, 2013

(30) Foreign Application Priority Data
Oct. 19, 2011    (IN) ............................ 3592/CHE/2011

(51) Int. Cl.
*B01J 20/26* (2006.01)

(52) U.S. Cl.
USPC .................. 502/402; 96/11; 96/4; 96/7; 96/8; 96/14; 95/45; 95/47; 95/51; 95/139

(58) Field of Classification Search
USPC .............. 502/404, 402; 96/11, 4, 7, 8, 10, 14; 95/45, 47, 51, 139
See application file for complete search history.

(56) References Cited

U.S. PATENT DOCUMENTS

| | | | |
|---|---|---|---|
| 7,309,385 B2 * | 12/2007 | Hong et al. | ........................ 96/11 |
| 2008/0202341 A1 | 8/2008 | Poole et al. | |
| 2010/0147188 A1 | 6/2010 | Mamak et al. | |
| 2011/0186789 A1 | 8/2011 | Samulski et al. | |
| 2011/0269919 A1 | 11/2011 | Min et al. | |
| 2011/0269920 A1 | 11/2011 | Min et al. | |
| 2011/0284805 A1 | 11/2011 | Samulski et al. | |
| 2012/0024153 A1 | 2/2012 | Barron et al. | |

FOREIGN PATENT DOCUMENTS

| | | |
|---|---|---|
| CA | 2596536 A1 | 8/2006 |
| CN | 101124031 A | 2/2008 |
| CN | 101250325 A | 8/2008 |
| CN | 101492253 A | 7/2009 |
| CN | 101492569 A | 7/2009 |
| CN | 102115598 A | 7/2011 |
| JP | 2008528285 A | 7/2008 |
| WO | WO2006/082436 A1 | 8/2006 |
| WO | WO2009/143405 A2 | 11/2009 |

OTHER PUBLICATIONS

International Search Report and Written Opinion for PCT/IB2011/003083 dated May 11, 2012.

(Continued)

*Primary Examiner* — Colleen Dunn
*Assistant Examiner* — Haytham Soliman
(74) *Attorney, Agent, or Firm* — Pepper Hamilton LLP

(57) ABSTRACT

Nanocomposite adsorbent materials and methods for their preparation and use are described. As an example, a polyaniline-graphite nanoplatelet nanocomposite may be used to adsorb carbon dioxide.

9 Claims, 1 Drawing Sheet

(56) References Cited

OTHER PUBLICATIONS

Belmabkhout et al., Adsorption of $Co_2$ from dry gasses on MCM-41 silica at ambient temperature and high pressure. 1: Pure $Co_2$adsorption, *Chemical Engineering Science* (Sep. 1, 2009), 64(17):3721-3728 (Abstract).

Boyer et al., Vibrational Analysis of Polyaniline. A Model Compound Approach, *J. Phys. Chem. B* (Aug. 27, 1998), 102(38):7382-7392 (Abstract).

Cavenati et al., Adsorption Equilibrium of Methane, Carbon Dioxide, and Nitrogen on Zeolite 13X at High Pressures, *J. chem. Eng. Data* (Jun. 5, 2004), 49(4):1095-1101 (Abstract).

Colthup, Spectra-Structure Correlations in the Infra-Red Region, *Journal of the Optical Society of America* (Jun. 1950), 40(6):397-400.

Du et al., Facile synthesis of highly conductive polyaniline/graphite nanocomposites, *European Polymer Journal* (Mar. 20, 2004), 40:1489-1493.

Hui, Preparation and Properties of Graphite Nanoplatelets (GNPs) Hydrid Polymer Nanocomposites, Doctor of Philosophy, City University of Hong Kong (Sep. 2009) (Abstract and TOC).

Millward et al., Metal-Organic Frameworks with Exceptionally High Capacity for Storage of Carbon Dioxide at Room Temperature, *J. Am. Chem. Soc.* (Dec. 28, 2005), 127(51):17998-17999.

Mishra et al., Nano magnetite decorated multiwalled carbon nanotubes: a robust nanomaterial for enhanced carbon dioxide adsorption, *Energy & Environmental Science* (Dec. 6, 2010), 4:889-895 (Abstract).

Mishra et al., Study of $CO_2$ Adsorption in Low Cost Graphite Nanoplatelets, *International Journal of Chemical Engineering and Applications* (Oct. 2010), 1(3):266-269.

Nicolas-Debarnot et al., Polyaniline as a new sensitive layer for gas sensors, *Analytica Chimica Acta* (2003), 475:1-15.

Reddy et al., Asymmetric Flexible Supercapacitor Stack, *Nanoscale Res Lett.* (2008), 3:145-151.

Seredych et al., Role of Graphite Oxide (GO) and Polyaniline (PANI) in $NO_2$ Reduction on GO-PANI Composites, *Ind. Eng. Chem. Res.* (Sep. 15, 2007), 46:6925-6935.

Siriwardane et al., Adsorption of $CO_2$ on Molecular Sieves and Activated Carbon, *Energy and Fuels* (Feb. 7, 2001), 15(2):279-284 (Abstract).

Steurer et al., Functionalized Graphenes and Thermoplastic Nanocomposites Based Upon Expanded Graphite Oxide, *Macromolecular Rapid Communications* (Jan. 8, 2009), 30(4-5):316-327 (Abstract).

Tung et al., The effects of dopant on morphology formation in polyaniline graphite nanoplatelet composite, *Synthetic Metals* (Jan. 2011), 161(1-2):177-182 (Abstract).

Zhang et al., Enhancement of $CO_2$ adsorption on high surface area activated carbon modified by $N_2$, $H_2$ and ammonia, *Chemical Engineering Journal* (Jun. 1, 2010), 160(2):571-577 (Abstract).

\* cited by examiner

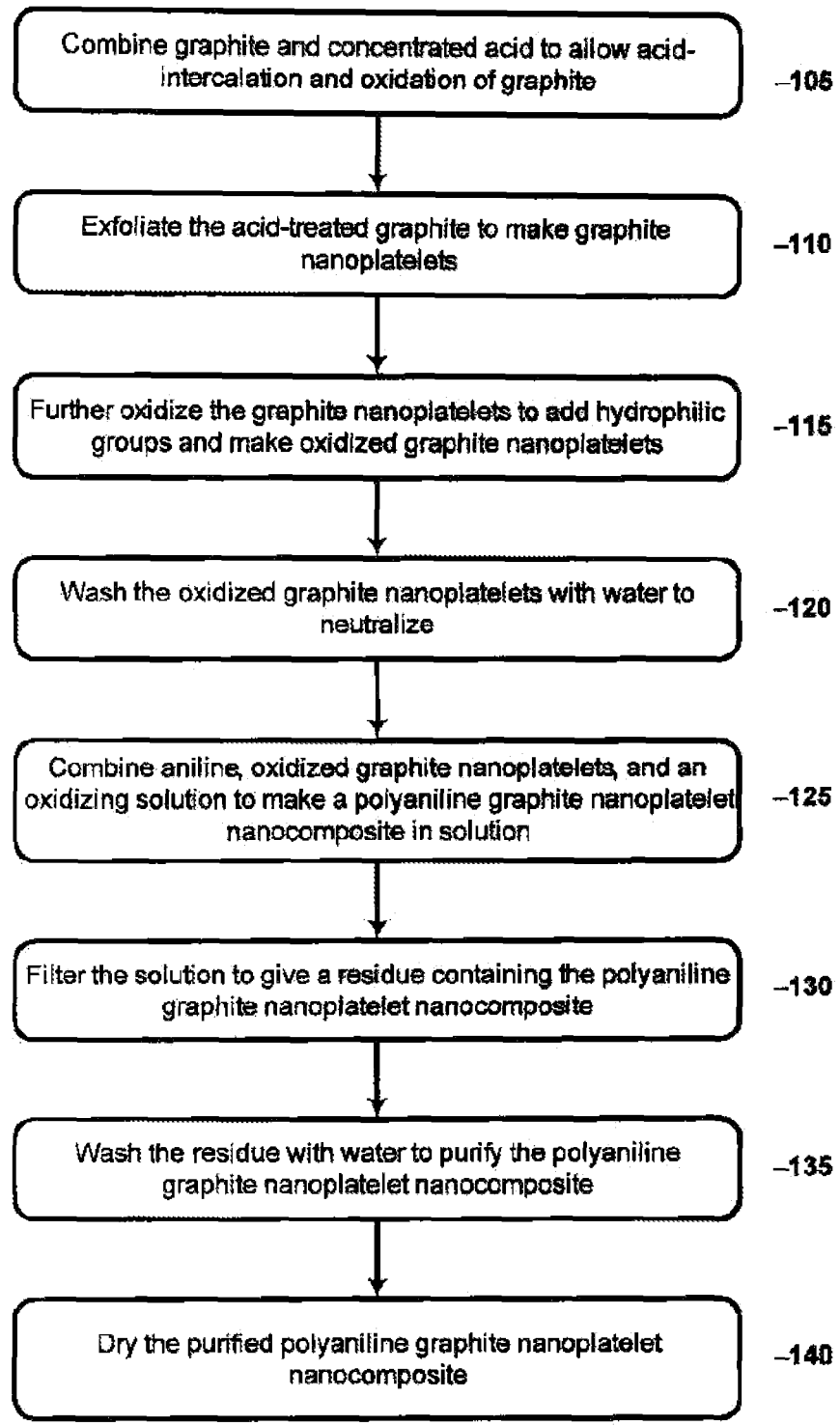

POLYANILINE-GRAPHITE NANOPLATELET MATERIALS

CLAIM OF PRIORITY

This application is a national phase application under 35 U.S.C. §371 of International Application No. PCT/IB2011/003083, filed Dec. 19, 2011, which claims benefit to 3592/CHE/2011, filed Oct. 19, 2011, which is incorporated herein by reference in its entirety.

FIELD

Carbon dioxide adsorbents and methods of making and using them are described. More particularly, some embodiments relate to polyaniline-graphite nanoplatelet adsorbents for carbon dioxide and methods of making and using the same.

BACKGROUND

Fossil fuels supply more than 90% of the world's energy needs. However, the combustion of fossil fuels is one of the major sources of the green house gas carbon dioxide, which is suspected to have a role in global warming. Current carbon dioxide capture technology is very expensive and energy intensive, suffering from inherent regeneration cost and inefficiency due to the possible corrosion in the presence of $O_2$ and other impurities. Amine based solvents exhibit a high degree of carbon dioxide uptake mainly due to the presence of an amine group. The amine groups chemically interact with carbon dioxide, providing a high adsorption capacity. Some amine based ionic liquids have attracted attention due to their good carbon dioxide uptake capacity, but preparation of such ionic liquids is a tedious process. In addition, these adsorbents suffer because adsorption capacity is limited to approximately room temperature.

SUMMARY

This disclosure is not limited to the particular systems, devices and methods described, as these may vary. The terminology used in the description is for the purpose of describing the particular versions or embodiments only, and is not intended to limit the scope.

In an embodiment, nanocomposite materials composed of polyaniline and graphite nanoplatelets are described. The materials can be configured to reversibly adsorb carbon dioxide. In other embodiments, nanocomposite materials composed of an amine-containing polymer and a graphitic material can be configured to reversibly adsorb carbon dioxide.

In an embodiment, methods of making a nanocomposite adsorbent material including the growth of polyaniline over the surface of oxidized graphite nanoplatelets are described. In other embodiments, methods of making a nanocomposite adsorbent material including the growth of an amine-containing polymer from the surface of an oxidized graphitic material are described.

In an embodiment, methods of adsorbing carbon dioxide using a nanocomposite adsorbent material composed of polyaniline and graphite nanoplatelets are described. The methods can include contacting the nanocomposite adsorbent material with carbon dioxide or a mixture containing carbon dioxide. In other embodiments, methods of adsorbing carbon dioxide using a nanocomposite adsorbent material composed of an amine-containing polymer and a graphitic material are described. The methods can include contacting the nanocomposite adsorbent material with carbon dioxide or a mixture containing carbon dioxide.

The graphitic material of some embodiments may be selected from, but is not limited to: graphene, graphite, graphite nanoplatelets, oxidized graphite, fullerenes, carbon nanotubes or any combination thereof. The amine-containing polymer of some embodiments may be selected from, but is not limited to: polyaniline, polypyrrole, poly(allylamine), poly(ethylenimine), or any combination thereof.

BRIEF DESCRIPTION OF THE DRAWINGS

FIG. 1 is a flowchart that illustrates an exemplary method for making a polyaniline-graphite nanoplatelet adsorbent, in accordance with an embodiment.

DETAILED DESCRIPTION

Nanocomposite adsorbents, methods of making nanocomposite adsorbents, and methods of using nanocomposite materials are described herein. The nanocomposite adsorbents, the methods of making the nanocomposite adsorbents, and the methods of using the nanocomposite materials described herein are not limited to a single composition or a single process.

Based on their respective adsorption properties, combining amine-containing polymers with oxidized graphitic materials in a composite material may result in a material that can adsorb carbon dioxide (a carbon dioxide adsorbent). Some embodiments provide a nanocomposite adsorbent comprising at least one graphitic material; and at least one amine-containing polymer, wherein the nanocomposite adsorbent is configured to adsorb carbon dioxide. In some embodiments, the nanocomposite adsorbent may be configured to reversibly adsorb carbon dioxide, retain carbon dioxide, desorb carbon dioxide, or combinations thereof. In some embodiments, the at least one graphitic material is selected from graphene, graphite, graphite nanoplatelets, oxidized graphite, fullerenes, carbon nanotubes or any combination thereof. In some embodiments, the at least one amine-containing polymer is selected from polyaniline, polypyrrole, poly(allylamine), poly(ethylenimine), or any combination thereof.

Increased amine functionality is believed to improve the adsorption of carbon dioxide by the nanocomposite adsorbents. As such, any amine-containing polymer may be used in the described technology. The amine-containing polymer may be selected from, but is not limited to: polyaniline, polypyrrole, poly(allylamine), poly(ethylenimine), or any combination thereof.

High surface area is believed to improve the adsorption of carbon dioxide by the nanocomposite adsorbents. As such, any oxidized graphitic material may be used in the described technology. The oxidized graphitic material may be selected from, but is not limited to: oxidized graphene, graphite oxide, oxidized graphite nanoplatelets, oxidized fullerenes, oxidized carbon nanotubes, or any combination thereof.

A nanocomposite adsorbent can comprise at least one graphite nanoplatelet, and at least one polyaniline-amine containing polymer. The nanocomposite adsorbent can be configured to adsorb carbon dioxide. In some embodiments, the nanocomposite adsorbent may be configured to reversibly adsorb carbon dioxide, retain carbon dioxide, desorb carbon dioxide, or combinations thereof. The nanocomposite adsorbent may exhibit a Fourier transform infrared (FTIR) spectrum comprising bands at about 1125 $cm^{-1}$, about 1293 $cm^{-1}$, about 1496 $cm^{-1}$, about 1579 $cm^{-1}$, about 2850 $cm^{-1}$, about 2919 cm$^{-1}$, about 3433 cm$^{-1}$, or combinations of two or more of these bands. In some embodiments, the nanocomposite adsorbent may exhibit a Fourier transform infrared (FTIR) spectrum comprising bands at all seven wavenumbers. In some embodiments, the nanocomposite adsorbent with adsorbed or retained carbon dioxide may exhibit a Fourier transform infrared (FTIR) spectrum comprising bands at any one or more of the seven wavenumbers listed above and a band at about 1384 cm$^{-1}$ (which may indicate the chemical adsorption of carbon dioxide), a band at about 2318 cm$^{-1}$ (which may indicate the physical adsorption of carbon dioxide), or combinations thereof. In some embodiments, the nanocomposite adsorbent may adsorb or be capable of adsorbing at least about 50 mmol of carbon dioxide per gram of nanocomposite adsorbent at about 11 bar pressure and about 25° C. The nanocomposite adsorbent may be functional at increased temperatures, and may adsorb or be capable of adsorbing at least about 20 mmol of carbon dioxide per gram of nanocomposite adsorbent at about 11 bar pressure and about 100° C. In some embodiments, the nanocomposite adsorbent may desorb or be capable of desorbing at least about 90% of adsorbed carbon dioxide at a pressure of about 10$^{-9}$ bar and a temperature of about 140° C. The nanocomposite may be in the physical form of a solid powder.

In some embodiments, a nanocomposite adsorbent is prepared by growing at least one amine-containing polymer over the surface of at least one oxidized graphitic material. In other embodiments, a nanocomposite adsorbent is prepared by coating at least one oxidized graphitic material with at least one amine-containing polymer. The oxidized graphitic material may be selected from, but is not limited to: oxidized graphene, graphite oxide, oxidized graphite nanoplatelets, oxidized fullerenes, oxidized carbon nanotubes, or any combination thereof.

In some embodiments, a nanocomposite adsorbent can be made by growing polyaniline above the surface of oxidized graphite nanoplatelets. Graphitic materials may be oxidized by numerous methods, and the specific method or extent of oxidation is not intended to limit the scope of the current application.

In some embodiments, graphite may be added to concentrated acid to oxidize or partially oxidize the graphite and may lead to acid-intercalated graphite. The concentrated acid may be selected from, but is not limited to: nitric acid, sulfuric acid, hydrochloric acid, or combinations thereof. The acid-treated graphite may be exfoliated to make graphite nanoplatelets. Exfoliation methods may be selected from, but are not limited to: high-temperature exposure, sonication, microwave irradiation, electromagnetic radiation, or any combination thereof. Graphite nanoplatelets may be further oxidized with concentrated nitric acid, and thereby modified with hydrophilic functional groups including but not limited to: —COOH, —C=O, and —OH. The oxidized graphite nanoplatelets may be neutralized by washing with water or buffer.

Aniline is known to undergo oxidative condensation polymerization. As such, polyaniline may be grown above the surface of oxidized graphite nanoplatelets by combining aniline and oxidized graphite nanoplatelets in an oxidizing solution to produce a polyaniline-graphite nanoplatelet nanocomposite. The oxidizing solution may include, but is not limited to: $K_2Cr_2O_7$, $KMnO_4$, or $(NH_4)S_2O_8$. The solution may be filtered to obtain a residue comprising the polyaniline-graphite nanoplatelet nanocomposite. Remaining oxidant and monomer may be removed by washing the residue with water or buffer, leading to a purified polyaniline-graphite nanoplatelet nanocomposite. Drying the purified polyaniline-graphite nanoplatelet nanocomposite may provide the nanocomposite adsorbent as a solid powder. The nanocomposite adsorbent may exhibit a Fourier transform infrared (FTIR) spectrum comprising bands at about 1125 cm$^{-1}$, about 1293 cm$^{-1}$, about 1496 cm$^{-1}$, about 1579 cm$^{-1}$, about 2850 cm$^{-1}$, about 2919 cm$^{-1}$, about 3433 cm$^{-1}$, or combinations of two or more or all of these bands. In some embodiments, the nanocomposite adsorbent may exhibit a Fourier transform infrared (FTIR) spectrum comprising bands at all seven wavenumbers.

In some embodiments, a nanocomposite adsorbent, as described herein, may adsorb or be capable of adsorbing carbon dioxide by contacting the nanocomposite adsorbent with carbon dioxide or a mixture comprising carbon dioxide. In other embodiments, a nanocomposite adsorbent, as described herein, may adsorb or be capable of adsorbing hydrogen gas by contacting the nanocomposite adsorbent with hydrogen gas or a mixture comprising hydrogen gas. Gas mixtures may include, but are not limited to: industrial exhaust, automobile exhaust, flue gas, and purified gases. The contacting step can be performed at generally any temperature. The mixture to be treated may be at a temperature between about 0° C. and about 200° C., between about 10° C. and about 150° C., between about 15° C. and about 125° C., or at any temperature or range of temperatures between the listed ranges. For example, the mixture to be treated may be at a temperature of about 20° C. to about 110° C. The contacting step can be performed at generally any pressure. The contacting step may be performed between about 1 bar and about 20 bar, between about 2 bar and about 15 bar, between about 5 bar and about 12 bar, or at any pressure or range of pressures between the listed ranges. For example, the contacting step may be performed between about 1 bar and about 15 bar. In such process, the nanocomposite adsorbent may adsorb or be capable of adsorbing at least about 30 mmol, at least about 50 mmol, at least about 70 mmol, at least about 100 mmol, or any value or range of values between those listed of carbon dioxide per gram of nanocomposite adsorbent. For example, the nanocomposite adsorbent may adsorb or be capable of adsorbing at least about 50 mmol of carbon dioxide per gram of nanocomposite adsorbent. In some situations, the total capacity of the nanocomposite adsorbent may not be reached, for example, when an excess of nanocomposite adsorbent is used.

In some embodiments, a nanocomposite adsorbent comprising graphite nanoplatelets polyaniline may be used to adsorb carbon dioxide. The adsorption of carbon dioxide by the nanocomposite adsorbent may be reversible. In some embodiments, the method of adsorbing carbon dioxide may include contacting the nanocomposite adsorbent with carbon dioxide or a mixture comprising carbon dioxide. The contacting step can generally be performed at any temperature. For example, the mixture may contact the nanocomposite adsorbent at a temperature of about 20° C. to about 110° C. The nanocomposite adsorbent may adsorb or be capable of adsorbing at least about 50 mmol of carbon dioxide per gram of nanocomposite adsorbent at about 11 bar pressure and about 25° C., or at least about 20 mmol of carbon dioxide per gram of nanocomposite adsorbent at about 11 bar pressure and at about 100° C. In some embodiments, the adsorbed carbon dioxide may be desorbed from the nanocomposite adsorbent. Desorption may occur at a pressure between about 10$^{-5}$ bar and about 10$^{-11}$ bar, between about 10$^{-6}$ bar and about 10$^{-10}$ bar, between about 10$^{-8}$ bar and 10$^{-10}$ bar, or any pressure or range of pressures between those listed and a temperature between about 100° C. and about 250° C., between about 120° C. and about 200° C., between about 130° C. and about 180° C., or any temperature or range of temperatures between those listed. For example, desorption may occur at a pressure of about $10^{-9}$ bar and a temperature of about 140° C. The nanocomposite adsorbent may exhibit a Fourier transform infrared (FTIR) spectrum comprising bands at about 1125 $cm^{-1}$, about 1293 $cm^{-1}$, about 1496 $cm^{-1}$, about 1579 $cm^{-1}$, about 2850 $cm^{-1}$, about 2919 $cm^-$, about 3433 $cm^{-1}$, or combinations of two or more of these bands. In some embodiments, the nanocomposite adsorbent may exhibit a Fourier transform infrared (FTIR) spectrum comprising hands at all seven wavenumbers. In some embodiments, the nanocomposite adsorbent with adsorbed or retained carbon dioxide may exhibit a Fourier transform infrared (FTIR) spectrum comprising bands at any one or more of the seven wavenumbers listed above and a band at about 1384 $cm^{-1}$ (which may indicate the chemical adsorption of carbon dioxide), a band at about 2318 $cm^{-1}$ (which may indicate the physical adsorption of carbon dioxide), or combinations thereof. In some embodiments, the nanocomposite adsorbent may adsorb or be capable of adsorbing at least about 50 mmol of carbon dioxide per gram of nanocomposite adsorbent at about 11 bar pressure and about 25° C.

Embodiments illustrating the method and materials used may be further understood by reference to the following non-limiting examples

EXAMPLES

Example 1

Synthesis of PANI/GNP Nanocomposite Adsorbent

Graphite was vigorously stirred with concentrated nitric acid and concentrated sulfuric acid in a 1:3 ratio by volume for three days to form acid intercalated graphite. The intercalated graphite was thermally exfoliated at 1000° C. to form graphite nanoplatelets (GNPs). GNPs were further treated with concentrated nitric acid, to introduce hydrophilic functional groups (—COOH, —C═O, and —OH) at the surface of the GNPs. The functionalized GNPs were washed several times with water to achieve pH 7 followed by drying. Aniline was added a mixture of functionalized GNPs and $K_2Cr_2O_7$ in 1 molar hydrochloric acid to initiate condensation polymerization of aniline and the formation of a polyaniline/graphite nanoplatelet (PANI/GNP) nanocomposite. The nanocomposite material was then filtered and washed with copious amounts of water and subsequently with ethanol to remove the residual oxidant. Finally, the nanocomposite was washed with acetone and dried at 60° C. This synthetic method produced the PANI/GNP nanocomposite adsorbent as a dry powder, which exhibited a Fourier transform infrared (FTIR) spectrum with bands at about 1125 $cm^{-1}$, about 1293 $cm^{-1}$ about 1496 $cm^{-1}$, about 1579 $cm^{-1}$, about 2850 $cm^{-1}$, about 2919 $cm^{-1}$, and about 3433 $cm^{-1}$.

Example 2

Adsorption of Carbon Dioxide by PANI/GNP

Carbon dioxide adsorption by the PANI/GNP nanocomposite was tested using a Sieverts apparatus with an equilibrium carbon dioxide pressure of 11 bar and a temperature of 100° C. The adsorption capacity was calculated using the ideal gas equation using van der Waals corrections. Adsorption was found to be 23.2 mmol of carbon dioxide per gram of PANI/GNP.

Example 3

Adsorption of Carbon Dioxide by GNP Lacking Polymer

Carbon dioxide adsorption by uncoated GNPs was tested using a Sieverts apparatus with an equilibrium carbon dioxide pressure of 11 bar and a temperature of 100° C. The adsorption capacity was calculated using the ideal gas equation using van der Waals corrections. Adsorption was found to be only 3.5 mmol of carbon dioxide per gram of GNP.

Example 4

Desorption of Carbon Dioxide from PANI/GNP

Desorption of carbon dioxide gas from the PANI/GNP nanocomposite was performed at 140° C. under vacuum ($10^{-9}$ bar). After desorption of carbon dioxide, the morphology of the nanocomposite was unaltered and the adsorption capacity was within 5% of earlier value. It is suspected that incomplete desorption causes the observed change in capacity. The adsorption-desorption cycle was repeated 20 times, and the capacity of the PANI/GNP nanocomposite was preserved.

In the present disclosure, reference is made to the accompanying FIGURE, which form a part hereof. The illustrative embodiments described in the detailed description, FIGURE, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURE, may be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or FIGURE, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A nanocomposite adsorbent comprising:
at least one graphite nanoplatelet having an oxidized surface; and
at least one polyaniline containing polymer on the oxidized surface.

2. The nanocomposite adsorbent of claim 1, wherein the nanocomposite adsorbent is capable of reversibly adsorbing carbon dioxide, retaining carbon dioxide, desorbing carbon dioxide, or combinations thereof.

3. The nanocomposite adsorbent of claim 1, wherein the nanocomposite adsorbent exhibits a Fourier transform infrared (FTIR) spectrum comprising bands at about 1125 $cm^{-1}$, about 1293 $cm^{-1}$, about 1496 $cm^{-1}$, about 1579 $cm^{-1}$, about 2850 $cm^{-1}$, about 2919 $cm^{-1}$, about 3433 $cm^{-1}$, or combinations thereof.

4. The nanocomposite adsorbent of claim 1, wherein the nanocomposite adsorbent with adsorbed or retained carbon dioxide exhibits a Fourier transform infrared (FTIR) spectrum comprising a band at about 1384 $cm^{-1}$, a band at about 2318 $cm^{-1}$, or a combination thereof.

5. The nanocomposite adsorbent of claim 1, wherein the nanocomposite adsorbent is capable of adsorbing at least about 50 mmol of carbon dioxide per gram of nanocomposite adsorbent at about 11 bar pressure and about 25° C.

6. The nanocomposite adsorbent of claim 1, wherein the nanocomposite adsorbent is capable of adsorbing at least about 20 mmol of carbon dioxide per gram of nanocomposite adsorbent at about 11 bar pressure and about 100° C.

7. The nanocomposite adsorbent of claim 1, wherein the nanocomposite adsorbent is capable of adsorbing at least about 90% of adsorbed carbon dioxide at a pressure of about 10-9 bar and a temperature of about 140° C.

8. The nanocomposite adsorbent of claim 1, wherein the nanocomposite adsorbent is a solid powder.

9. The nanocomposite adsorbent of claim 1, wherein the nanocomposite adsorbent is adapted to adsorb carbon dioxide.

* * * * *